UNITED STATES PATENT OFFICE.

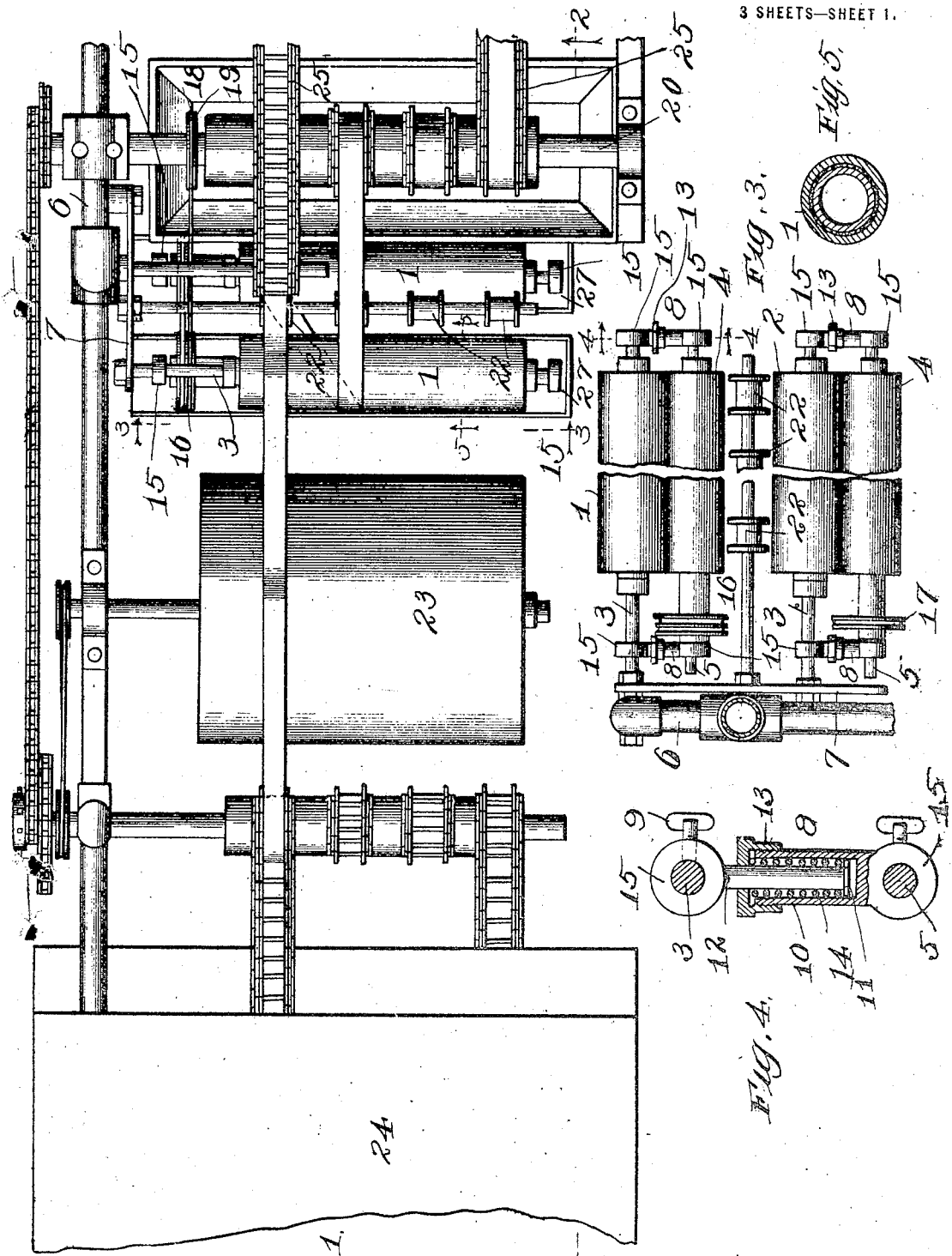

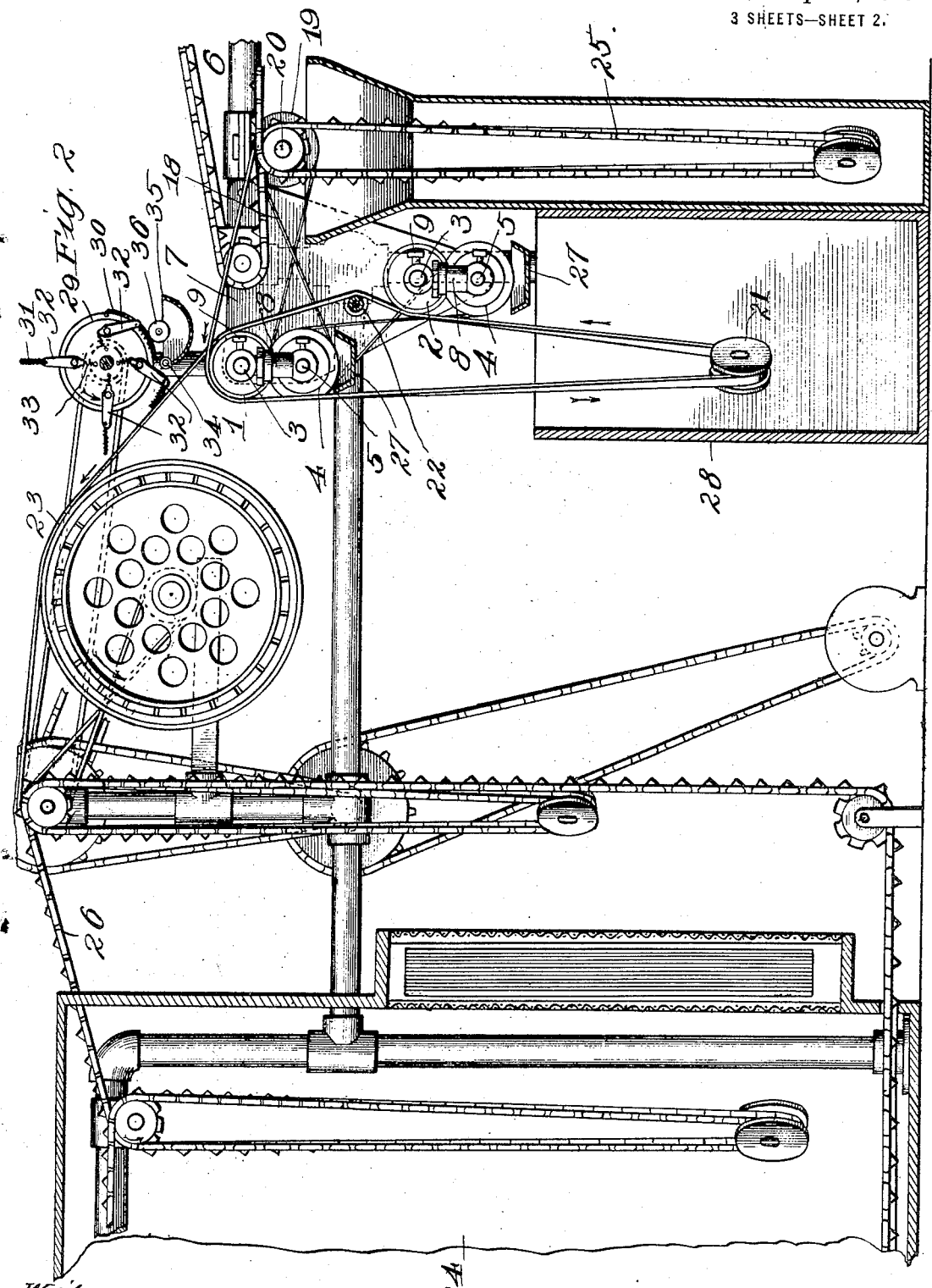

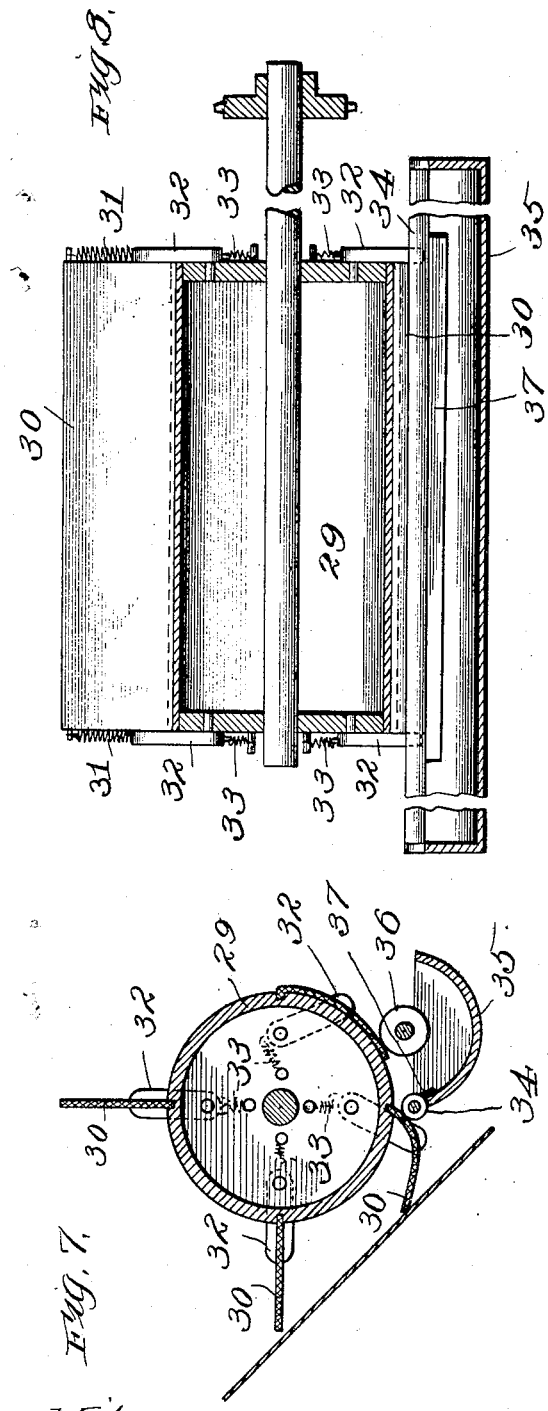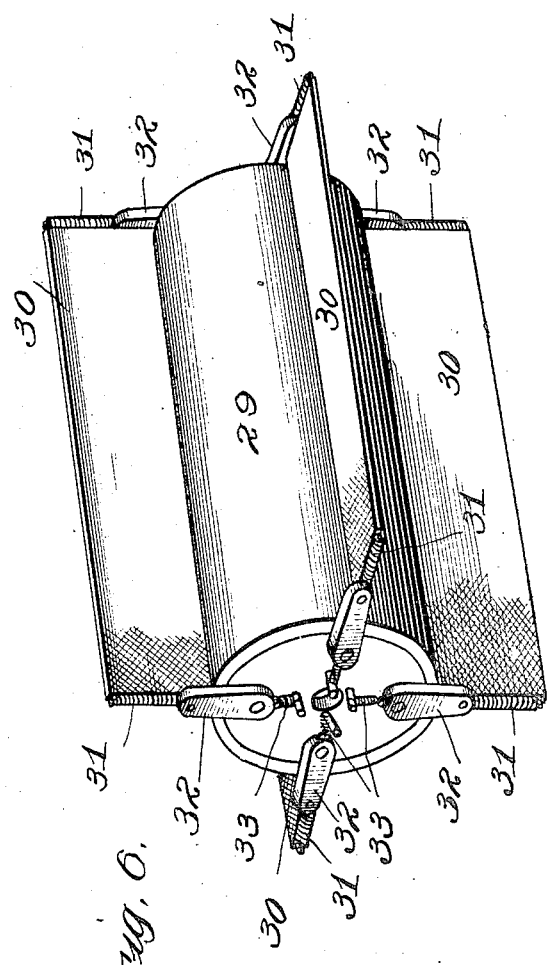

FREDRICK B. THOMPSON, OF CHICAGO, ILLINOIS.

FILM-WIPING APPARATUS.

1,299,266.  Specification of Letters Patent.  Patented Apr. 1, 1919.

Application filed August 16, 1915. Serial No. 45,845.

*To all whom it may concern:*

Be it known that I, FREDRICK B. THOMPSON, citizen of the United States, residing at Chicago, in the county of Cook and State of Illinois, have invented certain new and useful Improvements in Film-Wiping Apparatus; and I do hereby declare the following to be a full, clear, and exact description of the invention, such as will enable others skilled in the art to which it appertains to make and use the same.

This invention has for its object to provide a device for removing drops of water from the surface of film tape such as is employed in taking and projecting motion pictures, and is adapted to be used in connection with an apparatus or machine for developing, fixing, washing or otherwise treating such film by means of liquids, the particular object of the invention being to provide a device which will quickly, and without injury to either the sensitized face or back of the film, remove so much of the moisture therefrom as will prevent spotting of the same and will promote drying thereof.

In the accompanying drawings illustrating the invention I have shown the device as associated with a film-treating apparatus such as is particularly described and claimed in my copending application for Letters Patent filed the 16th day of August, 1915, Ser. No. 45,846 in which the device forming subject of this application is diagrammatically illustrated and briefly described.

In said drawings:

Figure —1— is a top plan view of a film wiping apparatus constructed in accordance with my invention, and showing fragments of film-treating apparatus and film-drying apparatus associated therewith, a part of said wiping apparatus being omitted.

Fig. —2— is a vertical longitudinal section of same on the line 2—2 of Fig. —1—.

Fig. —3— is a detail view in elevation of the wiping rolls and wringer rolls associated therewith.

Fig. —4— is a detail vertical section on the line 4—4 of Fig. —3—.

Fig. —5— is a detail section of one of the wiping rolls.

Fig. —6— is an enlarged detail perspective of a wiping device for the sensitized face of the film shown in Fig. —2— and omitted from Fig. —1—.

Fig. —7— is a vertical transverse section of the same.

Fig. —8— is a central vertical longitudinal section.

My said film-wiping device comprises a plurality of rollers 1 and 2 over which the film is adapted to be successively passed so that its opposite faces contact alternately with said rolls. Each of said rolls is rotatably mounted on a shaft 3 and associated with each of same is what I term a wringer roll 4 rotatably mounted on a shaft 5. The said shafts 3 are suitably supported at one end on the frame-work of the machine exemplified by the standard 6 and plate 7 secured thereto. The shafts 5 are supported at their ends in hangers 8 depending from said shafts 3 and secured to the latter by means of the thumb-nuts 9. Each of said hangers comprises two relatively movable parts, one thereof constituting a cylinder 10 in which the head 11 of the plunger 12, constituting the other part, is reciprocably movable. The latter passes through the removable bead 13 of said cylinder 10. A helical compression spring 14 is interposed between the head 13 and the said head 11 around the plunger 12 and serves to maintain the collars 15 engaged with the shafts 3 and 5 respectively, normally at the inner limits of their relative movement. The rollers 4 are thus maintained compressed against the surfaces of the rollers 1 and 2. The latter are preferably padded and at least the outer surfaces thereof consist of chamois skin or buckskin, or similar material which is highly absorbent of moisture and presents a very smooth non-abrasive and slippery surface which will not, by contact of the film tape traveling over the same, scratch or mar either face of such film even though the same be extremely soft and liable to injury.

The said rollers 4 are geared by means of the sheaves 17 and 16 with each other and with a source of power in such a manner as to cause the rolls 1 or 2 to rotate in respectively opposite directions relatively to each other and in a direction opposite to the direction of travel of the film tape over the same. The double sheave 16 rigid with one of said rollers 4 is geared by means of the belt 18 to a sheave 19 on a shaft 20 equipped with sprockets over which the carrier for film tape of a film-treating apparatus is trained, as particularly described in my aforesaid copending application and illustrated in fragment in Figs. —1— and —2—. The said belt 18 is crossed to cause the said roller 4 rotated thereby to revolve in the direction opposite to that of the sheave 20 and a belt gearing the two rollers 4 with each other is similarly crossed to cause them to rotate in opposite directions.

Associated with the said rollers 1 and 2 is an idle drum 21, an idle roll 22 and a driven drum 23 of larger diameter, the latter being geared to the mechanism and motor for imparting movement to a film carrier for passing the film through a drying apparatus 24, particularly described in my aforesaid copending application.

The film tape which is carried by the carrier 25 through one or more tanks containing liquids to the action of which said film is subjected, is detached from said carrier and manually passed first over the roll 1 then over the idle drum or spool 21; then over the roll 2, then over the idle roll 22, and over the drum 1, and then over the drum 23, and is then attached to the carrier 26 for passing said film tape through said drying chamber 24. The said rolls 1 and 2 may be of sufficient width to accommodate a plurality of films at the same time and in that event the idle rolls 22 associated therewith will correspond in number with the number of films trained over said rolls; said idle rolls being provided with said flanges for guiding the film so that the side edges thereof will not contact with each other during travel.

The film tape passes with its back or unsensitized face first over the roll 1 then over the drum 21 and its sensitized face is then brought into contact with the roll 2 as the other face, which has already been wiped, passes over the idle roll 22. The position of the idle roll 22 and drum or spool 21 relative to the roller 2 is such as to cause the sensitized face of the film to bear very lightly upon the surface of said roll 2; this being obviously essential for the reason that the emulsion on said sensitized face being wet, is very soft and easily scratched or removed from the tape. In other words, the said roll 2 is so positioned as to only slightly deflect the film tape from its path of travel as defined by the roll or drum 21 and the idle roll 22, said roll 21 being of a weight sufficient to maintain the film-tape taut in travel.

The frictional contact of the rolls 4 with the rolls 1 and 2 will, of course, cause the latter to be rotated at the same surface speed as said rolls 4 and the direction of rotation of said rolls 1 and 2 will be opposite to the direction of travel of the film tape thereover, but relatively slowly. During such passage of the film tape over the same the water adhering to the film surfaces will obviously be wiped off, and will be absorbed by the surface coatings of said rolls 1 and 2 and the latter will thereby become practically saturated. The pressure exerted thereon by the rolls 4 will, however, cause such water to be wrung from the absorbent surfaces of the rolls 1 and 2 and such water will pass over the surfaces of the rolls 4 and drip from the latter into any suitable receptacles disposed to receive such drippings. Troughs 27 may be disposed underneath the rolls 4 to receive such drippings and lead the same to a suitable receptacle or drain therefor, or the same may be permitted to collect in the tank 28 disposed underneath said drums. The latter is, however, preferably employed only when it is desired to pass the film through glycerin or a similar substance contained in such tank 28.

The said device operates very efficiently to remove all surplus moisture or drops of water from the faces of the film thereby not only promoting rapid drying of the latter, but preventing the spotting of the film due to the evaporation from the surface thereof of drops of water adhering thereto, and leaving a deposit of mineral matter on the surfaces of such film. Thus the film when completely dried will be in the best possible condition for use.

It will be obvious, of course, that the number and relative disposition of the wiping rolls may be changed and varied at will without departing from the invention. I have found that two of such rolls, that is, one for wiping each face is generally sufficient and it will be noted that in my said apparatus the back or unsensitized face of the film passes twice into contact with the surface of the roll 1 so that any drops of water still remaining thereon or splashed thereon from the drippings from the rolls 4 will be wiped from such surface and said faces further subjected to the action of the surface of the drum 23 which is preferably covered with an absorbent cloth or fabric disposed thereon in a relatively thick pad; it being obvious that the amount of moisture adapted to be taken up by said padding of the roller 23 will be very small and will so quickly evaporate as to always present a dry surface to the film in travel of the latter.

In order to further dry the sensitized face of the film-tape I provide a device for gently wiping the same preferably at a point in its travel from the roll 1 to the roll 23. This device comprises a suitable cylinder 29 of metal or other hard, non-absorbent material which is suitably geared to rotate so that the point in its periphery nearest adjacent the path of travel of said film moves in a general direction opposite to the direction of travel of said film.

Secured along one edge each to the surface of the cylinder 29 are a plurality of substantially rectangular pieces 30 of chamois or buckskin, the side edges of which are secured to wires 31 or other suitable stiffenings. These are preferably disposed just beyond the ends of the cylinder 29 and are secured in any suitable manner to the levers 32 pivotally secured between their ends to the ends of said cylinder 29 and are normally held by means of tension springs 33 to extend radially of said cylinder, said pieces 30 being thus held to normally project radially of said cylinder and to rotate at their outer edge portions through the path of travel of the film-tape and thus contacting with the upper or sensitized face of the latter.

Associated with said cylinder is an idle roll 34 of greater length than said cylinder, the end-portions thereof being disposed in the path of the levers 32 so that as the latter contact therewith they will be turned on their pivots against the action of said springs 33 thereby causing the pieces 30 to approach the surface of the cylinder 29. The said idle roll is disposed contiguous to one edge of a trough 35 adapted to collect water wrung from said skins 30, this wringing being accomplished by an idle roll 36 mounted at the middle of said trough and which is of the same or substantially the same length as said cylinder 29 and is held by means such as are illustrated in Fig. —4— in yielding surface contact with said cylinder 29. The pieces 30 thus pass successively between said roll 36 and said cylinder 29 and are thus wrung out to an extent to enable them to gather up all free liquid carried by the face of the film over which said skins 30 pass.

The edge of the trough contiguous to the idle roll 34 is provided with a wiper 37 of rubber or other suitable material which bears at all times upon the surface of said roll 34 and wipes the same to remove free liquid therefrom which may gather thereon during passage of the skins 30 over the same, the water thus collected by the wiper 37 and dripping from the wringer roll 36 collecting in said trough 35 and being suitably drained therefrom.

The relative arrangement of the several parts may also be varied as may other details of the construction without departing from the invention as defined in the appended claims.

I claim as my invention:

1. Apparatus for treating photographic film tape after such tape has been passed through liquids, and before passing the same through a drying chamber, means for removing surface liquid from said film preparatory to drying the same, said means including a roller having a smooth non-abrasive absorbent surface over which the film tape is adapted to travel, and a wringer roll associated with said roller for extracting therefrom liquid collected from said film tape.

2. Apparatus for treating photographic film tape after such tape has been passed through liquids, and before passing the same through a drying chamber, means for removing surface liquid from said film preparatory to drying the same, said means including a roller having a smooth non-abrasive absorbent surface over which the film tape is adapted to slide, means for rotating said roller to cause the surface thereof contacting with said film tape to move in the direction of travel of the latter, and means associated with said roller for removing therefrom liquid collected from the film tape.

3. Apparatus for treating photographic film tape after such tape has been passed through liquids, and before passing the same through a drying chamber, means for removing surface liquid from said film preparatory to drying the same, said means including a roller having a smooth non-abrasive absorbent surface over which the film tape is adapted to travel, and means associated with said roller for removing therefrom liquid collected from the film tape.

4. Apparatus for treating photographic film tape after such tape has been passed through liquids, and before passing the same through a drying chamber, means for removing surface liquid from said film preparatory to drying the same, said means including a roller having a smooth non-abrasive absorbent surface over which the film tape is adapted to travel, a similar roller over which the opposite face of the film is adapted to travel, and means associated with said rollers for removing therefrom liquid collected from said film tape.

5. Apparatus for treating photographic film tape after such tape has been passed through liquids, and before passing the same through a drying chamber, means for removing surface liquid from said film preparatory to drying the same, said means including a roller having a smooth non-abrasive absorbent surface over which the film tape is adapted to travel, a similar roller over which the opposite face of the film is adapted to travel, means associated with said rollers for determining the pressure of their surface contact with the film-tape surfaces, and means associated with said rollers for removing therefrom liquid collected from said film tape.

6. In a apparatus for developing, fixing, washing and drying photographic film tape, a film wiping apparatus interposed between the film washing and drying portions for removing surface liquid from said film tape, said wiping apparatus comprising a plurality of rollers having non-abrasive absorbent surfaces over which the respective film-faces are adapted to travel, means associated with said rollers and engaging the film tape for determining the pressure of their surface contact with each other, and means associated with said rollers for removing therefrom liquid collected thereby from said film tape.

7. In an apparatus for developing, fixing, washing and drying photographic film tape, a film wiping apparatus interposed between the film washing and drying portions for removing surface liquid from said film tape, said wiping apparatus comprising a plurality of rollers having non-abrasive absorbent surfaces over which the respective film-faces are adapted to travel, means for rotating said rollers to effect travel of their surfaces in the direction of travel of the film tape, means associated with said rollers and engaging the film tape for determining the pressure of their surface contact with each other, and means associated with said rollers for removing therefrom liquid collected thereby from said film tape.

8. Apparatus for treating photographic film tape after the same has been passed through liquids and before passing the same through a drier, and including a carrier for passing the same through said drier, a film wiping apparatus associated with said drier and said carrier including a plurality of rollers having non-abrasive absorbent surfaces over which the respective film-faces are adapted to travel, means associated with said rollers and engaging the film tape for determining the pressure of their surface contact with each other, and means associated with said rollers for removing therefrom liquid collected thereby from said film tape, one end of said film tape being adapted to be attached to said carrier and to be drawn thereby over said rollers preparatory to being passed through said drier.

9. Apparatus for treating photographic film tape after the same has been passed through liquids and before passing the same through a drier, and including a carrier for passing the same through said drier, a film wiping apparatus associated with said drier and said carrier including a plurality of pairs of rollers each comprising a roller having a non-abrasive yielding absorbent surface and a hard surfaced roller spring-held in yielding surface contact therewith, one roller of each pair being driven and the other thereof idle, the film tape being adapted to travel over the surfaces of said soft-surfaced rollers and one end thereof attached to said carrier, said hard-surfaced rollers adapted to wring from said soft-surfaced rollers liquid collected from said film-tape surfaces.

10. Apparatus for treating photographic film tape after the same has been passed through liquids and before passing the same through a drier, and including a carrier for passing the same through said drier, a film wiping apparatus associated with said drier and said carrier including a plurality of pairs of rollers each comprising a roller having a non-abrasive yielding absorbent surface and a hard surfaced roller spring-held in yielding surface contact therewith, one roller of each pair being driven and the other thereof idle, the film tape being adapted to travel over the surfaces of said soft-surfaced rollers and one end thereof attached to said carrier, said hard-surfaced rollers adapted to wring from said soft-surfaced rollers liquid collected from said film-tape surfaces, and means associated with said rollers and said film tape for determining the pressure of contact between the surfaces of said respective parts.

11. Apparatus for treating photographic film tape after the same has been passed through liquids and before passing the same through a drier, and including a carrier for passing the same through said drier, a film wiping apparatus associated with said drier and said carrier including a plurality of pairs of rollers each comprising a roller having a non-abrasive yielding absorbent surface and a hard surfaced roller spring-held in yielding surface contact therewith, means for rotating said rollers of each pair in respectively opposite directions, one roller of each pair being driven and the other thereof idle, the film tape being adapted to travel over the surfaces of said soft-surfaced rollers and one end thereof attached to said carrier, said hard-surfaced rollers adapted to wring from said soft-surfaced rollers liquid collected from said film-tape surfaces, said soft-surfaced rollers adapted to rotate in the direction of travel of the film tape.

12. Apparatus for treating photographic film tape after the same has been passed through liquids and before passing the same through a drier, and including a carrier for passing the same through said drier, a film wiping apparatus associated with said drier and said carrier including a plurality of pairs of rollers each comprising a roller having a non-abrasive yielding absorbent surface and a hard surfaced roller spring-held in yielding surface contact therewith, means for rotating said rollers of each pair in respectively opposite directions, one roller of each pair being driven and the other thereof idle, the film tape being adapted to travel over the surfaces of said soft-surfaced rollers and one end thereof attached to said carrier, said hard-surfaced rollers adapted to wring from said soft-surfaced rollers liquid collected from said film-tape surfaces, said soft-surfaced rollers adapted to rotate in the direction of travel of the film tape, and means associated with said rollers and said film tape for determining the pressure of contact between the surfaces of said respective parts.

In testimony whereof I have signed my name in presence of two subscribing witnesses.

FREDRICK B. THOMPSON.

Witnesses:
M. M. BOYLE,
ANDREW SMITH.